US005649390A

United States Patent [19]

Davidson

[11] Patent Number: 5,649,390

[45] Date of Patent: Jul. 22, 1997

[54] GARAGE DOOR DECORATIVE COVER

[76] Inventor: Ray E. Davidson, 2132 Gardenway Dr., Orleans, Ontario, Canada, K4A 3M2

[21] Appl. No.: 619,441

[22] Filed: Mar. 21, 1996

[51] Int. Cl.[6] ..................... B62D 63/04

[52] U.S. Cl. ..................... 52/3; 52/63; 52/105; 52/202; 52/745.06; 52/745.15; 40/601; 40/603; 160/179

[58] Field of Search ..................... 52/30, 5, 63, 105, 52/202, 506.01, 745.06, 745.15; 40/601, 603; 160/179

[56] References Cited

U.S. PATENT DOCUMENTS

| | | | |
|---|---|---|---|
| 4,590,714 | 5/1986 | Walker | 52/63 X |
| 4,805,735 | 2/1989 | Anderson | 52/63 X |
| 4,815,562 | 3/1989 | Denny et al. | 52/63 X |
| 4,875,549 | 10/1989 | Denny et al. | 52/63 X |
| 5,197,239 | 3/1993 | Glynn et al. | 52/63 X |

*Primary Examiner*—Robert Canfield
*Assistant Examiner*—Yvonne Horton-Richardson
*Attorney, Agent, or Firm*—Oliff & Berridge

[57] ABSTRACT

A decorative cover for a movable garage door and method of attachment thereof are provided that allow festive ornamentation of ordinary garage doors while maintaining full use of such garage doors. The decorative cover can be made of weather resistant material and printed with various festive designs on its surface. The decorative cover is installed by draping it onto the front of the garage door while the garage door is in its open position. The cover is then wrapped around the garage door and top and bottom ends of the cover are joined together on a back side of the garage door by any of several tethering methods to secure the cover to the garage door.

16 Claims, 4 Drawing Sheets

GARAGE DOOR DECORATIVE COVER

BACKGROUND OF THE INVENTION

1. Field of the Invention

The invention relates to decorative cover for garage doors that can be easily removably affixed to a movable hinged garage door to provide an aesthetically pleasing exterior cover that can include printed indicia.

2. Description of Related Art

To the best of my knowledge, there is presently no prior art that is similar in concept to this new invention.

OBJECTS AND SUMMARY OF THE INVENTION

It is an object of the invention to provide an additional type of decorating ornament for residential dwellings. This decorative ornament can be easily affixed to an exterior surface of a garage door and can remain affixed during normal opening and closing of the garage door without interference with or by the door.

The above and other objects are achieved by: providing a decorative cover sized larger in at least one dimension than a garage door to which the cover is to be later attached; providing at least top and bottom edges of the cover with attachment devices; draping the decorative cover over a front of the garage door while the garage door is at least partially open such that the top and bottom edges of the decorative cover wrap around to a rear side of the garage door; attaching at least some of the attachment devices directly to the garage door in a manner than allows partial movement of the edges of the decorative cover; and attaching at least one flexible attachment device to flexibly interconnect the top edge and the bottom edge of the decorative cover and take up slack in the decorative cover, the attachment devices attached directly to the garage door and the flexible attachment device accommodating sufficient movement of the decorative cover to allow for complete opening and closing of the garage door while preventing the decorative cover from riding up or down relative to the garage door.

BRIEF DESCRIPTION OF THE DRAWINGS

The invention will be described in detail with reference to the following drawings wherein.

DETAILED DESCRIPTION OF PREFERRED EMBODIMENTS

Figure 1:
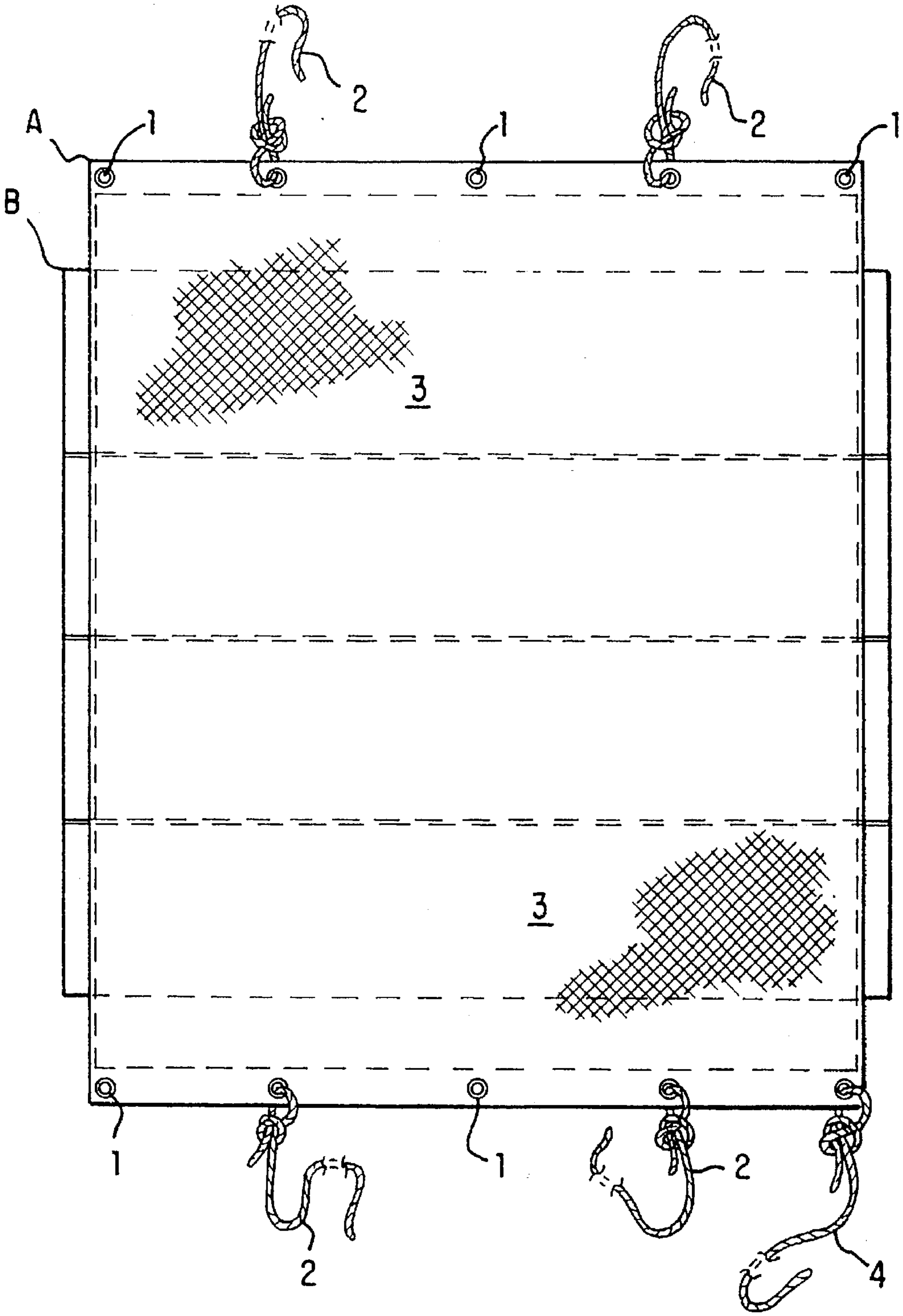
FIG. 1 illustrates a view of an extended decorative cover A and a garage door B.

With reference to FIG. 1, there is shown a decorative cover A for a garage door B of the type having a plurality of hinged door segments. The decorative cover A is formed preferably from a weather-resistant material and can be insulative. As shown, the decorative cover A is sized larger in one dimension than the garage door B to allow the cover A to wrap around the garage door B as better illustrated in FIG. 2.

At least top and bottom ends of the cover A include attachment devices, which preferably include spaced grommets 1 and tether devices 2, for attachment of the cover directly to the garage door to prevent the cover from riding up or down during opening of the garage door. The tether devices 2 can include tether cords, hooks or the like. At least one flexible attachment device 4, preferably a bungie-type or other elastic cord, is also provided. Preferably, the surface 3 of the cover is suitable for festive indicia or advertisement to be printed thereon.

Figure 2:
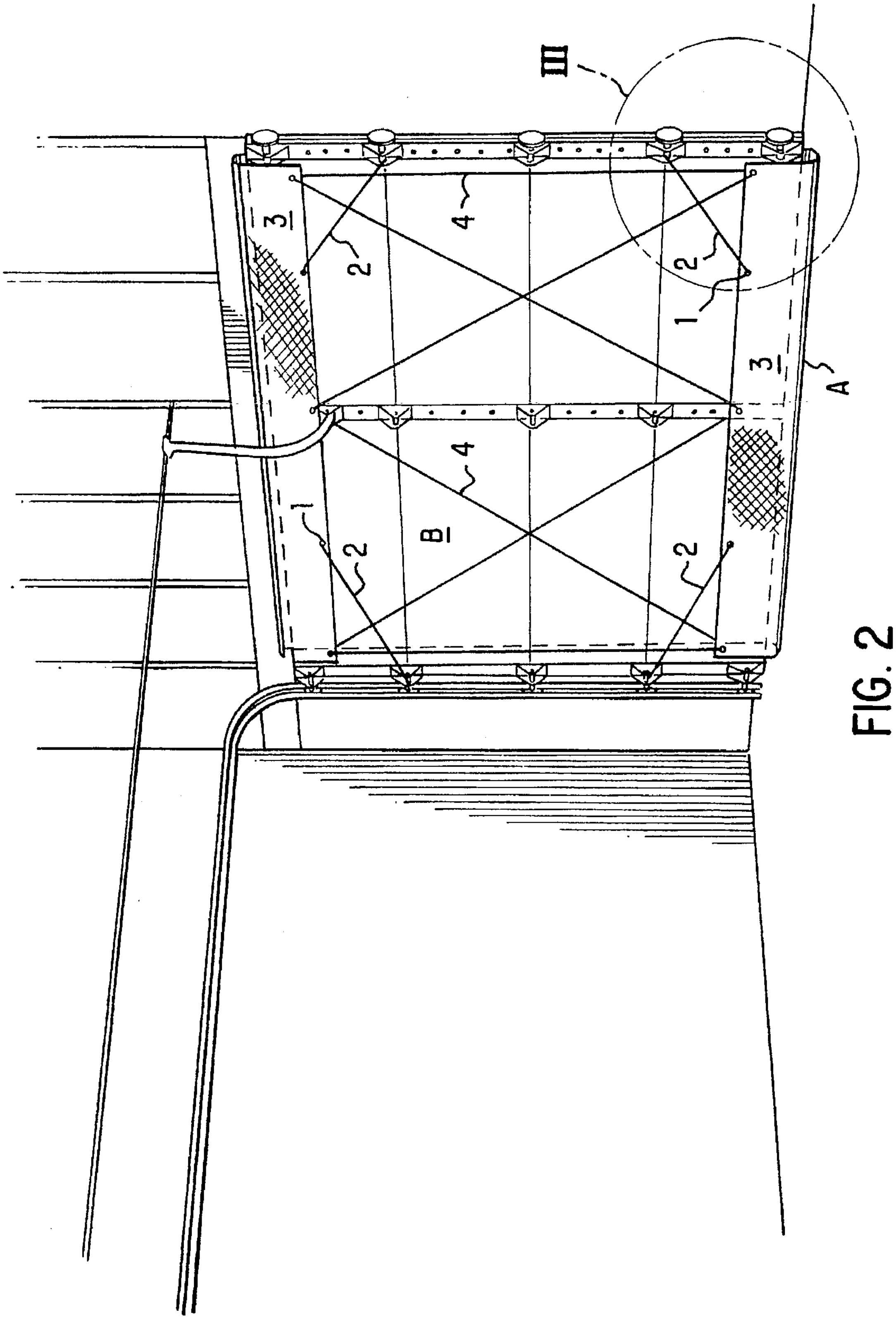
FIG. 2 illustrates a perspective rear view of the decorative cover A installed to garage door B.
Figure 3:
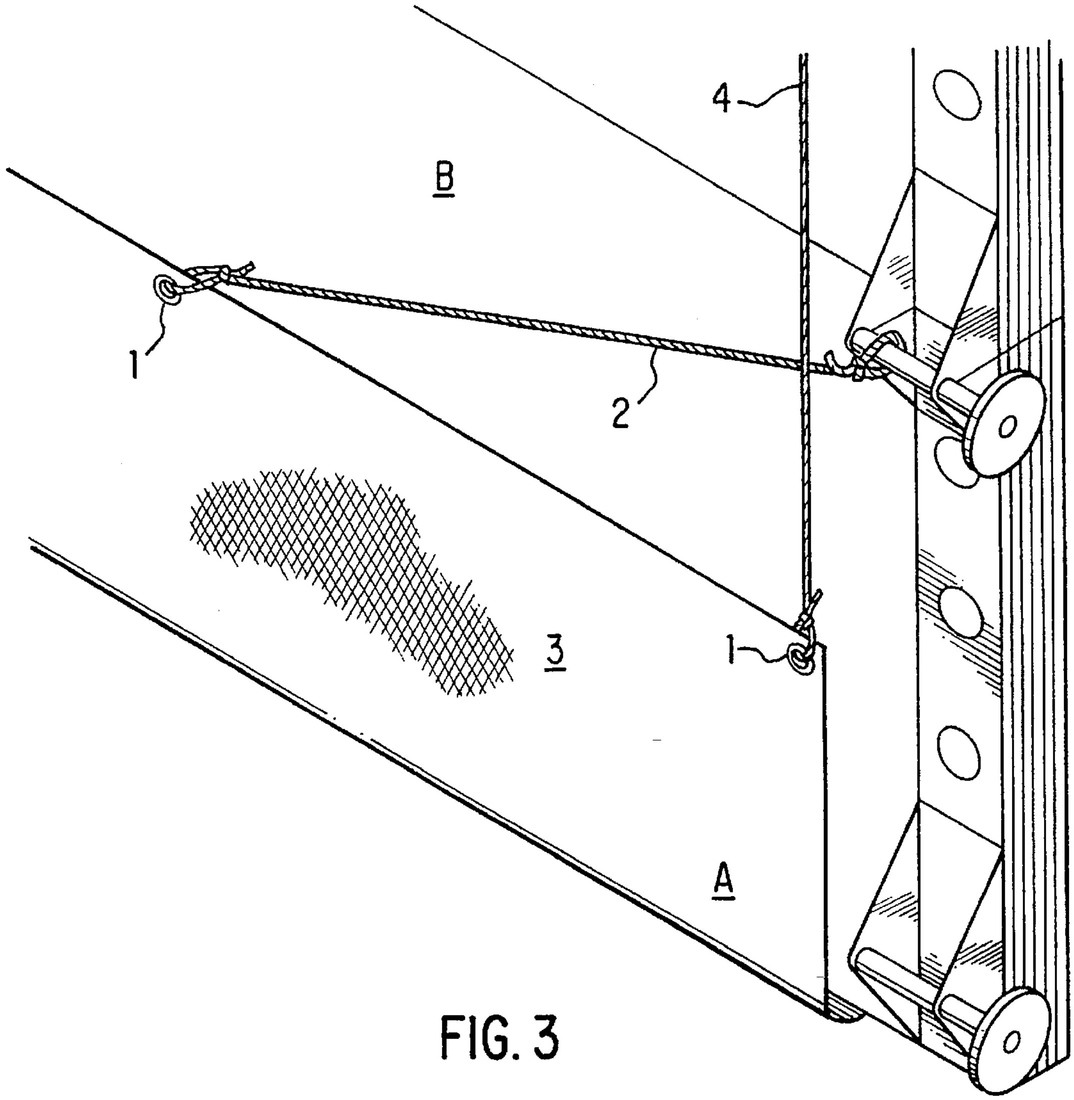
FIG. 3 illustrates a rear close up view of a lower right corner of the garage door shown in FIG. 2.

FIG. 2 illustrates a preferred attachment method for retaining the decorative cover A on the garage door B to allow full normal opening and closing of the garage door B. Tether devices 2, preferably a tether cord made out of nylon, for example, are tied between grommets 1 near left and right edges of the top and bottom of decorative cover A and the garage door. A suitable tying location for the opposite ends of the tether devices 2 is a hinge member of the garage door located between the top and bottom ends of the decorative cover as best illustrated in the close up view of FIG. 3.

Figure 4:
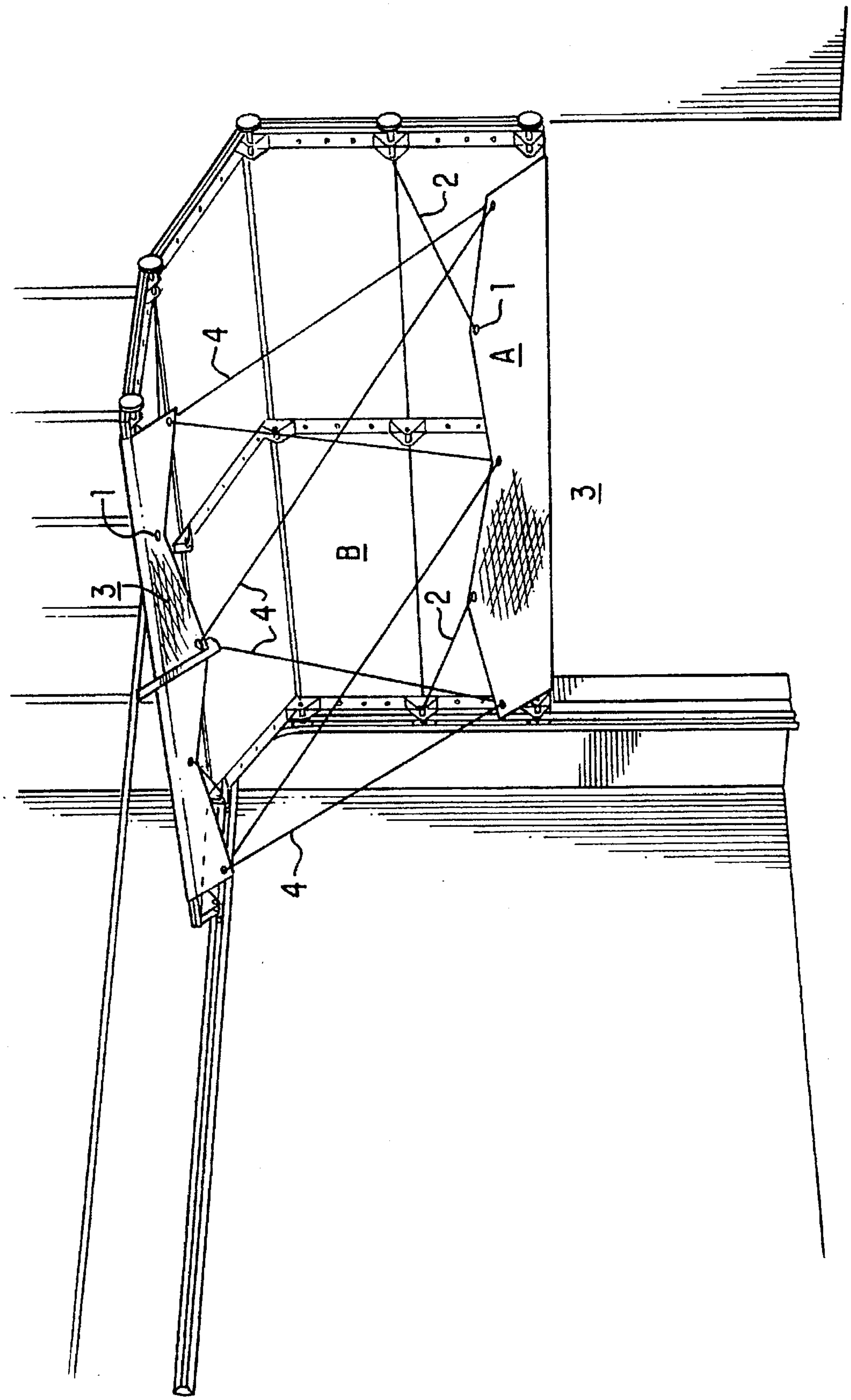
FIG. 4 illustrates another rear perspective view of the garage door and decorative cover with the garage door opened half way.

Flexible attachment device 4, preferably a bungie-type cord, connects one or more grommets 1 in the top end of the cover A with one or more grommets 2 in the bottom end of the cover A to take up slack in the cover and to accommodate stretch of the cover during opening of the garage door B as best illustrated in FIG. 4. A preferred attachment is the criss-cross attachment method illustrated, although other attachments are contemplated.

Alternatively, the attachment devices can include zippers, snaps, cords, Velcro, hooks or other equivalent structures for removably but stretchably affixing the decorative cover to the back side of the garage door B to accommodate opening and closing of the garage door B.

A method of installation of the decorative cover will now be described with reference to FIGS. 1–2 and 4. As previously stated, the cover A is sized in one dimension to be larger than the corresponding garage door B. While the garage door B is at least partially open, the top and bottom ends of the cover A are wrapped around the garage door B. Tether devices 2 can then be tied from grommets 1 to the hinges on the back side of the garage door B as shown. The flexible attachment device 4, bungie-type cord, is wrapped through one or more of the grommets 1 to elastically connect the top and bottom ends of cover A. As shown in both the closed position (FIG. 2) and the open position (FIG. 4), the flexible attachment device 4 takes up slack in the decorative cover A.

The invention has been described with reference to the preferred embodiments thereof, which are illustrative and not limiting. Various changes may be made without departing from the spirit and scope of the invention as defined in the appended claims.

I claim:

1. A combination garage door and decorative cover, comprising:
   - a garage door of a predetermined size positionable between open and closed positions;
   - a decorative cover fixedly located on an exterior front side of the garage door, the decorative cover being sized larger in at least one dimension than the garage door to which the cover is attached, top and bottom ends of the decorative cover extending around to a back side of the garage door;
   - attachment devices affixing top and bottom ends of the decorative cover directly to a back side of the garage door in a manner than allows partial movement of the ends of the decorative cover to allow for normal opening and closing of the garage door without the decorative cover riding up or down relative to the garage door; and at least one flexible attachment device flexibly connecting the top and bottom ends of the decorative cover together to take up slack in the decorative cover and accommodate sufficient movement of the decorative cover to allow for complete opening and closing of the garage door.

2. The garage door and decorative cover of claim 1, wherein said decorative cover is insulative.

3. The garage door and decorative cover of claim 1, wherein an exterior surface of the decorative cover includes decorative printed indicia.

4. The garage door and decorative cover of claim 1, wherein the attachment devices directly affixing the decorative cover to the garage door include one or more grommets located near the top and bottom ends of the decorative cover and a tether cord attached directly between the one or more grommets and the garage door.

5. The garage door and decorative cover of claim 4, wherein the tether cord is attached directly between the one or more grommets and a hinge of the garage door.

6. The garage door and decorative cover of claim 4, wherein the tether cord is attached to the garage door at a position between the top and bottom ends of the decorative cover.

7. The garage door and decorative cover of claim 4, wherein the flexible attachment device includes at least one elastic cord.

8. The garage door and decorative cover of claim 7, wherein the flexible attachment device includes at least one bungie-type cord.

9. A combination garage door and decorative cover, comprising:

a garage door of a predetermined size positionable between open and closed positions;

a decorative cover fixedly located on an exterior front side of the garage door, the decorative cover being sized larger in at least one dimension than the garage door to which the cover is attached, top and bottom ends of the decorative cover extending around to a back side of the garage door;

attachment devices affixing top and bottom ends of the decorative cover directly to a back side of the garage door in a manner than allows partial movement of the ends of the decorative cover to allow for normal opening and closing of the garage door without the decorative cover riding up or down relative to the garage door and to allow for complete opening and closing of the garage door.

10. A method of releasably fixing a decorative cover to a movable garage door, comprising:

providing a decorative cover sized larger in at least one dimension than a garage door to which the cover is to be later attached;

providing at least top and bottom edges of the cover with attachment devices;

draping the decorative cover over a front of the garage door while the garage door is at least partially open such that the top and bottom edges of the decorative cover wrap around to a rear side of the garage door;

attaching at least some of the attachment devices directly to the garage door in a manner than allows partial movement of the edges of the decorative cover;

attaching at least one flexible attachment device to flexibly interconnect the top edge and the bottom edge of the decorative device and take up slack in the decorative cover, the attachment devices attached directly to the garage door and the flexible attachment device accommodating sufficient movement of the decorative cover to allow for complete opening and closing of the garage door while preventing the decorative cover from riding up or down relative to the garage door.

11. The method of claim 10, further comprising a step of providing printed indicia on an externally facing side of the decorative cover.

12. The method of claim 10, wherein the top and bottom edges of the decorative cover include attachment devices comprising a plurality of spaced grommets and a plurality of tether cords, said step of attaching the decorative cover to the garage door including tying one end of a tether cord to a grommet located near left and right sides of each of the top and bottom edges and tying an opposite end of the tether cord to a portion of the garage door.

13. The method of claim 12, wherein one or more flexible cords are connected between at least one grommet located along the top edge and at least one grommet located along the bottom edge of the decorative cover.

14. The method of claim 12, wherein the step of attaching at least one flexible attachment device to flexibly interconnect the top edge and the bottom edge of the decorative device includes running an elastic cord through a plurality of the grommets in a criss-cross pattern.

15. The method of claim 12, wherein the step of attaching the decorative cover to the garage door includes tying said opposite end of the tether cord to a door hinge of the garage door.

16. The method of claim 15, wherein the opposite end of the tether cord is tied to a door hinge located between the top edge and the bottom edge of the decorative cover.

* * * * *